US007088396B2

(12) United States Patent
Fredlund et al.

(10) Patent No.: US 7,088,396 B2
(45) Date of Patent: Aug. 8, 2006

(54) SYSTEM AND CAMERA FOR CREATING LENTICULAR OUTPUT FROM DIGITAL IMAGES

(75) Inventors: John R. Fredlund, Rochester, NY (US); Kenneth A. Parulski, Rochester, NY (US); Joseph A. Manico, Rochester, NY (US); Raymond E. Wess, Holly, NY (US); Martin A. Parker, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 701 days.

(21) Appl. No.: 10/037,322

(22) Filed: Dec. 21, 2001

(65) Prior Publication Data

US 2003/0128287 A1 Jul. 10, 2003

(51) Int. Cl.
*H04N 5/222* (2006.01)

(52) U.S. Cl. .......................... 348/333.02; 348/333.05; 348/333.12; 348/207.99

(58) Field of Classification Search ............ 348/231.1, 348/221.1, 40, 58, 59, 333.02, 333.03, 42, 348/333.05, 207.2
See application file for complete search history.

(56) References Cited

U.S. PATENT DOCUMENTS

| | | | |
|---|---|---|---|
| 5,164,831 A | 11/1992 | Kuchta et al. | |
| 5,276,478 A | 1/1994 | Morton | |
| 5,687,412 A * | 11/1997 | McIntyre | 396/319 |
| 5,724,758 A | 3/1998 | Gulick, Jr. | |
| 5,737,087 A | 4/1998 | Morton et al. | |
| 5,845,166 A * | 12/1998 | Fellegara et al. | 396/429 |
| 5,940,121 A | 8/1999 | Mcintyre et al. | |
| 5,956,083 A * | 9/1999 | Taylor et al. | 348/231.6 |
| 6,188,518 B1 * | 2/2001 | Martin | 359/464 |
| 6,198,544 B1 * | 3/2001 | Wess et al. | 358/296 |
| 6,211,896 B1 * | 4/2001 | Morton | 347/225 |
| 6,237,264 B1 * | 5/2001 | Gulick, Jr. | 40/454 |
| 6,308,016 B1 * | 10/2001 | Malloy Desormeaux et al. | 396/284 |
| 6,366,281 B1 * | 4/2002 | Lipton et al. | 345/419 |
| 6,380,970 B1 * | 4/2002 | Minamikawa | 348/46 |
| 6,445,406 B1 * | 9/2002 | Taniguchi et al. | 348/51 |
| 6,507,358 B1 * | 1/2003 | Mori et al. | 348/42 |
| 6,608,622 B1 * | 8/2003 | Katayama et al. | 345/419 |
| 6,750,904 B1 * | 6/2004 | Lambert | 348/218.1 |
| 6,894,719 B1 * | 5/2005 | Blish et al. | 348/207.99 |

(Continued)

OTHER PUBLICATIONS

U.S. Appl. No. 09/004,046, filed Jan. 7, 1998, Ward et al.

(Continued)

*Primary Examiner*—David Ometz
*Assistant Examiner*—Nelson D. Hernandez
(74) *Attorney, Agent, or Firm*—Stephen H. Shaw (57) ABSTRACT

A digital camera for capturing images to be provided to a lenticular apparatus, including: a digital camera that can capture digital images; a memory that stores the captured digital images; a processor for processing the captured digital images, a display for displaying a motion sequence of captured images, and a user interface on the digital camera that enables a user to select a subset of the captured digital images and store the selected subset of the captured digital images in the memory prior to transmitting to a lenticular apparatus for constructing a lenticular hardcopy of the subset of the captured digital images, wherein the processor is used to produce a processed motion sequence including the adjacency effects that will be visible in the lenticular hardcopy, and the display is used to display the processed motion sequence.

8 Claims, 8 Drawing Sheets

U.S. PATENT DOCUMENTS

| | | | |
|---|---|---|---|
| 2001/0040625 A1* | 11/2001 | Okada et al. | 348/207 |
| 2002/0001036 A1* | 1/2002 | Kinjo | 348/231 |
| 2002/0021832 A1* | 2/2002 | Dawson | 382/154 |
| 2002/0071616 A1* | 6/2002 | Yoshida | 382/305 |
| 2003/0038889 A1* | 2/2003 | Blish et al. | 348/312 |

OTHER PUBLICATIONS

U.S. Appl. No. 09/569,170, filed May 11, 2000, Fredlund et al.

"Digital Still Camera Image File Format Standard," Version 2.1, Jun. 1998, Japan Electronic Industry Development Association.

Design Rule For Camera File System (DCF), Version 1.0, Dec. 1998 by the Japan Electronics Industries Development Association (JEIDA), Tokyo, Japan.

"PC Card Standard," Release 2.0, published by the Personal Computer Memory Card International Association, Sunnyvale, California, Sep. 1991.

"CompactFlash Specification" Version 1.4, published by the CompactFlash Association, Palo Alto, California, Aug. 5, 1998.

* cited by examiner

SYSTEM AND CAMERA FOR CREATING LENTICULAR OUTPUT FROM DIGITAL IMAGES

FIELD OF THE INVENTION

The present invention is directed to a system for creating lenticular motion cards from digital image files captured by a camera. More particularly, the invention is directed to a system for previewing and selecting digital images captured by a digital camera or by a hybrid film/digital camera. These selected images are forwarded to a service provider where a lenticular output such as a motion card is produced.

BACKGROUND OF THE INVENTION

As digital camera prices fall, digital image quality improves, and ease of use increases, more and more consumers will use digital cameras to fill their image capturing needs. Digital cameras offer many benefits. In particular, many digital cameras provide the capacity to capture segments of video or bursts of motion images. However, these motion images are presently useful only in screen-type displays.

There are many methods for printing images from digital cameras. Digital image files may be physically transferred to a computer via a memory card or by a data link between the computer and the digital camera. Once the digital image resides in the memory of the computer, a computer program can be used to select and print the images on a local printer. A computer may use a modem to transfer images over the phone lines or other communication networks to a remote photofinisher whereat the images may be printed. While the foregoing methods can be used to obtain prints from the digital image files, they are often time consuming and can often require complex use of a computer. Additionally, still image output from motion burst video files is often visually unsatisfying.

Another method of getting hard copy prints from digital image files is to transfer the digital image files directly to a printer from a memory card or by a data link between the printer and the camera. This approach may have more appeal as the aforementioned method because of ease of use, but the quality and utility of the print is limited to the printing capabilities of the local printer. Additionally, the consumer is forced to maintain the printer, and once again, still image output from motion burst video files is often visually unsatisfying.

Recently, the KODAK ADVANTIX Preview Camera™ was introduced. This is a hybrid film/digital camera which captures a low resolution digital image at the same time a film frame is exposed. A color LCD image display on the camera allows a consumer user to preview the image captured on film, and to indicate how many desired prints a photofinisher should produce from the film frame corresponding to the displayed digital image. The number of desired prints is encoded magnetically on the film, and read by the photofinisher. The system is limited, however, since only standard prints can be ordered. Such a camera could be adapted to also enable the user to order album pages, as described in commonly assigned U.S. Pat. No. 5,940,121, by Mcintyre et al., entitled, "Hybrid Camera System With Electronic Album Control," Aug. 17, 1999.

Lenticular motion cards can be produced as described in commonly-assigned U.S. Pat. No. 5,724,758, by Gulick, Jr., entitled, "Device and Method For Producing Lenticular Images With Motion," Mar. 10, 1998; U.S. Pat. No. 5,956,083, by Taylor et al., entitled "Camera And Method For Capturing Motion Sequences Useful For Integral Image Element Formation," Sep. 21, 1999; and U.S. Pat. No. 5,737,087, by Morton et al., entitled, "Motion-Based Hard Copy Imaging," Apr. 7, 1998. However, it is difficult for a consumer user of a hybrid or digital camera to easily use their captured images to produce lenticular motion cards, since the consumer cannot visualize the full appearance of such a motion card as they capture images or order prints using their digital or hybrid camera.

A need exists for a simple, economic, and visually satisfying system for creating lenticular output, such as lenticular motion cards, from digital and film images.

SUMMARY OF THE INVENTION

The above need is met according to the present invention with a digital camera for capturing images to be provided to a lenticular apparatus, that includes: a digital camera that can capture digital images; a memory that stores the captured digital images; a processor for processing the captured digital images; a display for displaying a motion sequence of captured images, and a user interface on the digital camera that enables a user to select a subset of the captured digital images and store the selected subset of the captured digital images in the memory prior to transmitting to a lenticular apparatus for constructing a lenticular hardcopy of the subset of the captured digital images, wherein the processor is used to produce a processed motion sequence including adjacency effects that will be visible in the lenticular hardcopy, and the display is used to display the processed motion sequence.

Another aspect of the present invention discloses a system for creating a lenticular hardcopy from captured images, that includes: a digital camera that captures digital images; a memory for storing the captured digital images; a processor for processing the captured digital images, a display for displaying a motion sequence of captured images, a user interface for selecting a subset of the captured digital images; and a communication channel that transmits the selected subset of captured digital images to an apparatus that constructs the lenticular hardcopy from the selected subset of captured digital images, wherein the processor is used to produce a processed motion sequence including adjacency effects that will be visible in the lenticular hardcopy, and the display is used to display the processed motion sequence prior to transmitting the selected subset of the captured digital images.

Still another aspect of the present invention provides for a method of selecting motion burst still images for lenticular motion card display: a) navigating through a set of motion burst still images such that a first endpoint is found; b) navigating through the set of motion burst still images such that a second endpoint is found; c) displaying the set of motion burst still images; d) selecting a subset of the motion burst still images corresponding to the second endpoint; e) storing the subset of motion burst still images onto a memory device; f) producing from the subset of motion burst still images, a processed motion sequence including adjacency effects that will be visible in a lenticular hardcopy; g) displaying the processed motion sequence, and h) transmitting the subset of motion burst still images to an apparatus that constructs the lenticular hardcopy from the selected subset of motion burst still images.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present invention provides a simple and economic solution to the problems of the prior art by providing a system and camera which allows for capturing, viewing, and selecting digital image data that is used by a service provider to create a lenticular image.

Figure 1:
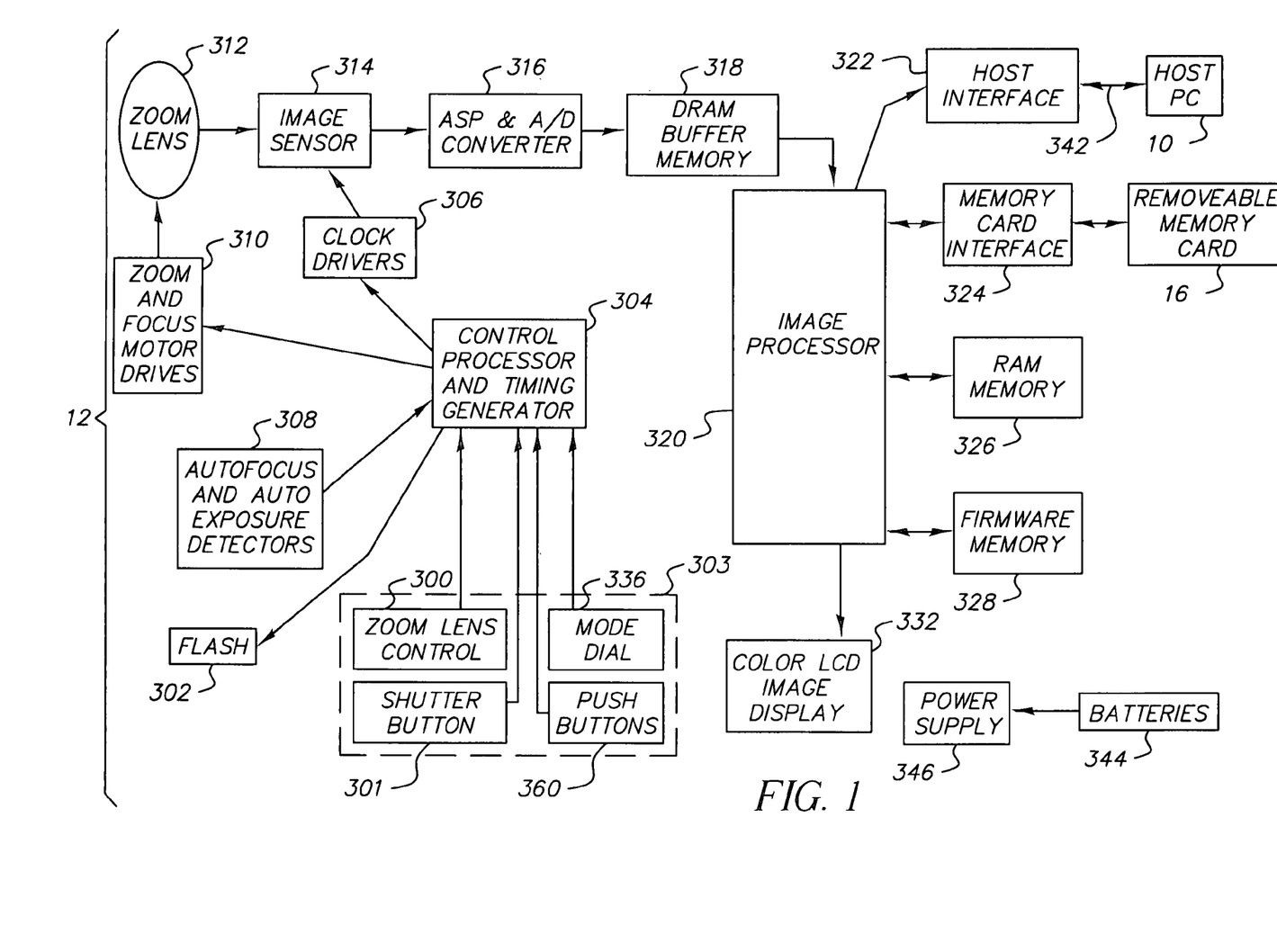
FIG. 1 illustrates in block form a digital camera for implementing the present invention.

FIG. 1 illustrates one embodiment of a digital camera for implementing the present invention. The digital still camera 12 produces digital images that are stored on the removable memory card 16. These images may be individual still images or motion burst images. The camera 12 is powered by batteries 344 which connect to power supply 346. The digital still camera 12 includes a zoom lens 312 having zoom and focus motor drives 310 and an adjustable aperture and shutter (not shown). Various user controls 303, such as zoom lens control 300, shutter button 301, a mode dial 336, and push buttons 360, send electronic signals to a control processor and timing generator 304. The user composes the image using the optical viewfinder (not shown) and the zoom lens control 300, and then depresses the shutter button 301 to begin capturing a still image. The zoom lens 312 focuses light from a scene (not shown) on an image sensor 314, for example, a single-chip color CCD image sensor, using the well-known Bayer color filter pattern. The image sensor 314 is controlled by clock drivers 306. The zoom and focus motor drives 310 and the clock drivers 306 are controlled by control signals supplied by the control processor and timing generator 304. The control processor and timing generator 304 receives input from autofocus and auto-exposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by an image processor 320 controlled by the firmware stored in the firmware memory 328, which can be flash EPROM memory. The firmware stored in firmware memory 328 controls the image processor 320 in the digital camera 12 in order to implement the method of operation of the present invention, as will be described later in reference to FIGS. 4 and 5. It is understood that the functions of image processor 320 and firmware memory 328 can alternatively be implemented using specific hardware components, including discrete logic or application specific integrated circuits (ASICs), or by a combination of programmable processors and specific hardware components.

The processed digital image file is provided to a memory card interface 324 which stores the digital image file on the removable memory card 16. Removable memory cards 16 are one type of removable image digital storage medium, and are available in several different physical formats. For example, the removable memory card 16 can include memory cards adapted to the PCMCIA card interface standard, as described in the *PC Card Standard, Release* 2.0, published by the Personal Computer Memory Card International Association, Sunnyvale, Calif., September 1991. The removable memory card 16 can also be adapted to the Compact Flash interface standard, such as described in the *CompactFlash Specification Version* 1.4, published by the CompactFlash Association, Palo Alto, Calif., Aug. 5, 1998, or to the well-known SmartMedia, MemoryStick, or SD memory card formats. Other types of removable image digital storage media, such as magnetic hard drives, magnetic tape, or optical disks, can alternatively be used to store the digital images.

The image processor 320 performs color interpolation followed by color and tone correction, in order to produce rendered sRGB image data. The rendered sRGB image data is then JPEG compressed and stored as a JPEG image file on the removable memory card 16. The JPEG file uses the so-called "Exif" image format defined in "*Digital Still Camera Image File Format (Exif)*" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings, and image captions or comments that can be selected or entered by the camera user.

The processor 320 also creates a low-resolution "thumbnail" size image, which can be created as described in commonly-assigned U.S. Pat. No. 5,164,831, by Kuchta et al., entitled "Electronic Still Camera Providing Multi-Format Storage Of Full And Reduced Resolution Images," Nov. 17, 1992. This thumbnail image has 160×120 pixels, to conform to the DCF rules described later, and is stored in RAM memory 326 and supplied to the color LCD image display 332.

The Exif image files, containing the JPEG compressed main image, thumbnail image, and the image metadata, are stored on the removable memory card 16 using a directory structure conforming to the so-called "DCF" rules defined in "*Design Rule For Camera File System*" version 1.0, December 1998 by the Japan Electronics Industries Development Association (JEIDA), Tokyo, Japan.

The camera creates an image utilization file, as described in commonly assigned U.S. patent application Ser. No. 09/004,046, by Ward, et al., entitled "Network Configuration File For Automatically Transmitting Images From An Electronic Still Camera," filed Jan. 7, 1998, the disclosure of which is herein incorporated by reference. The image utilization file is an ASCII text file containing these instructions, and is known as a Digital Print Order Format (DPOF) file. This file contains the data the service provider needs to select the proper frames to create the lenticular card.

Referring to FIG. 1, an interface cable 342 can be used to connect between a host interface 322 in the digital camera 12 and the corresponding camera interface in a host computer 10. The interface cable 342 may conform to, for example, the well-known universal serial bus (USB) interface specification. This interface can be used to download images found on the removable memory card 16 to the host computer 10. It can also be used to transfer data from host computer 10 to firmware memory 328 in digital camera 12. In particular, it can be used to transfer useful parameters for lenticular card fabrication, such as the preferred number of image frames that should be used to produce the card.

Figure 2:
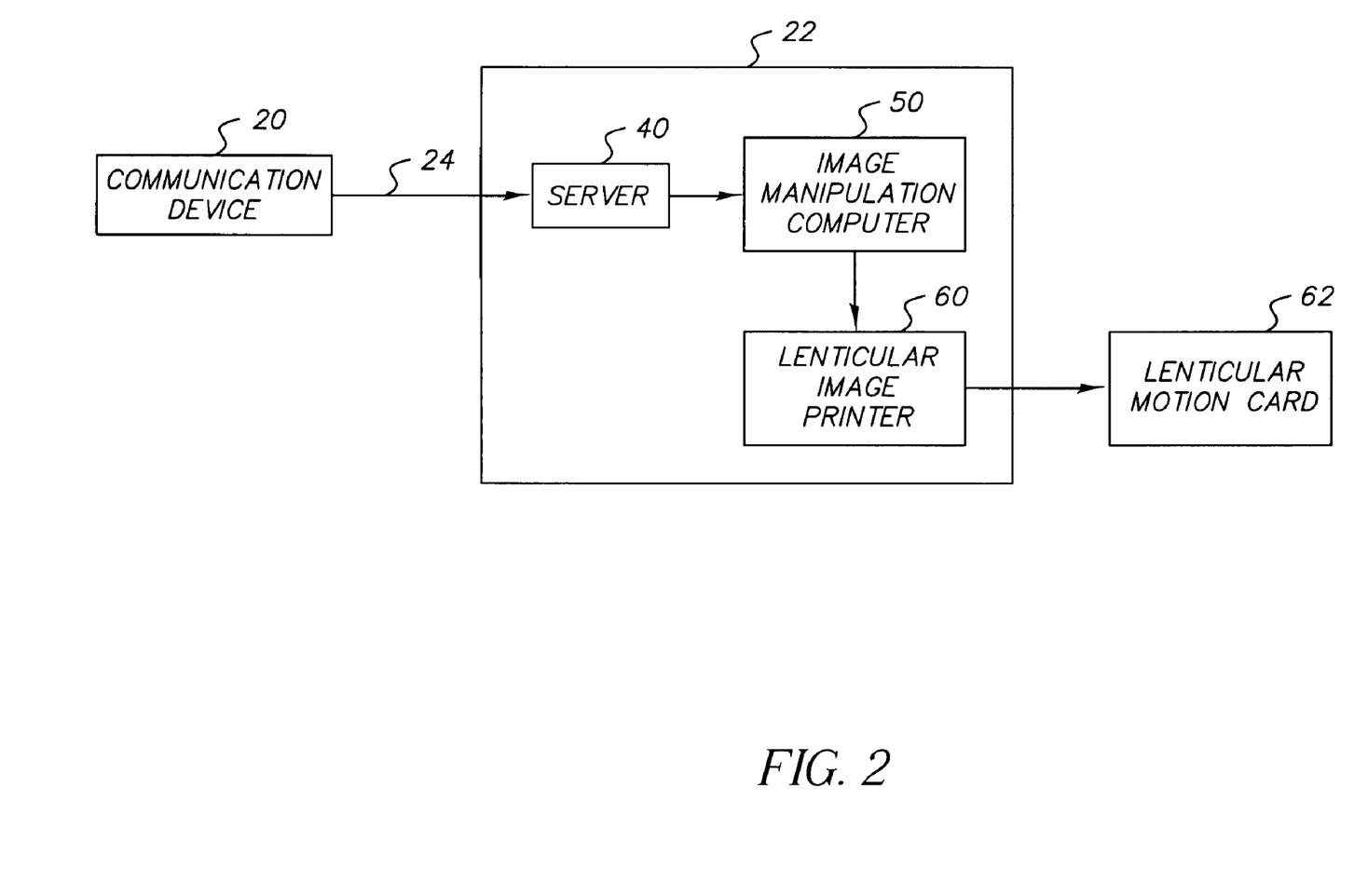
FIG. 2 illustrates the communication and implementation portion of the present invention.

As illustrated in FIG. 2 for the communication and implementation portion of the present invention, removable memory card 16, shown in FIG. 1, may be removed after the image files and print utilization file have been recorded by digital camera 12 and transported to a communication device 20. The communication device 20 can be designed as described in commonly assigned U.S. patent application Ser. No. 09/569,170, entitled "System and Apparatus for Automatically Forwarding Digital Images To A Service Provider," filed May 11, 2000, and incorporated herein by reference. The communication device 20 is designed to receive the removable memory card 16, read the appropriate information, and forward the information on to a service provider 22 where the images can be uploaded for providing the requested goods and/or services. The communication device 20 is one type of communication device, and is designed to be connected to service provider 22 over a communication network 24. In the particular embodiment illustrated in FIG. 2, the communication network 24 comprises phone lines. However, it is to be understood that the communication device 20 may utilize any other type of communication network 24 including wireless networks. Additionally, the communication device 20 may be a host computer 10 as shown in FIG. 1.

The service provider 22 receives the image files and a print utilization file at server 40. The image files are forwarded to image manipulation computer 50 where they are combined to create the single composite image necessary for creating a lenticular motion card 62. The combining can be done as described in commonly assigned U.S. Pat. No. 5,276,478, by Morton, entitled, "Method And Apparatus For Optimizing Depth Images By Adjusting Print Spacing," Jan. 4, 1994, the disclosure of which is incorporated herein by reference. Alternatively, the digital camera 12 or host computer 10 may have previously combined the image files into the necessary print file. In that event, the print file is then sent to the lenticular image printer 60 and printed. The ordered lenticular motion card 62 can then be provided to the customer. The lenticular motion card 62 is delivered to the customer, for example, through the mail system.

Figure 3:
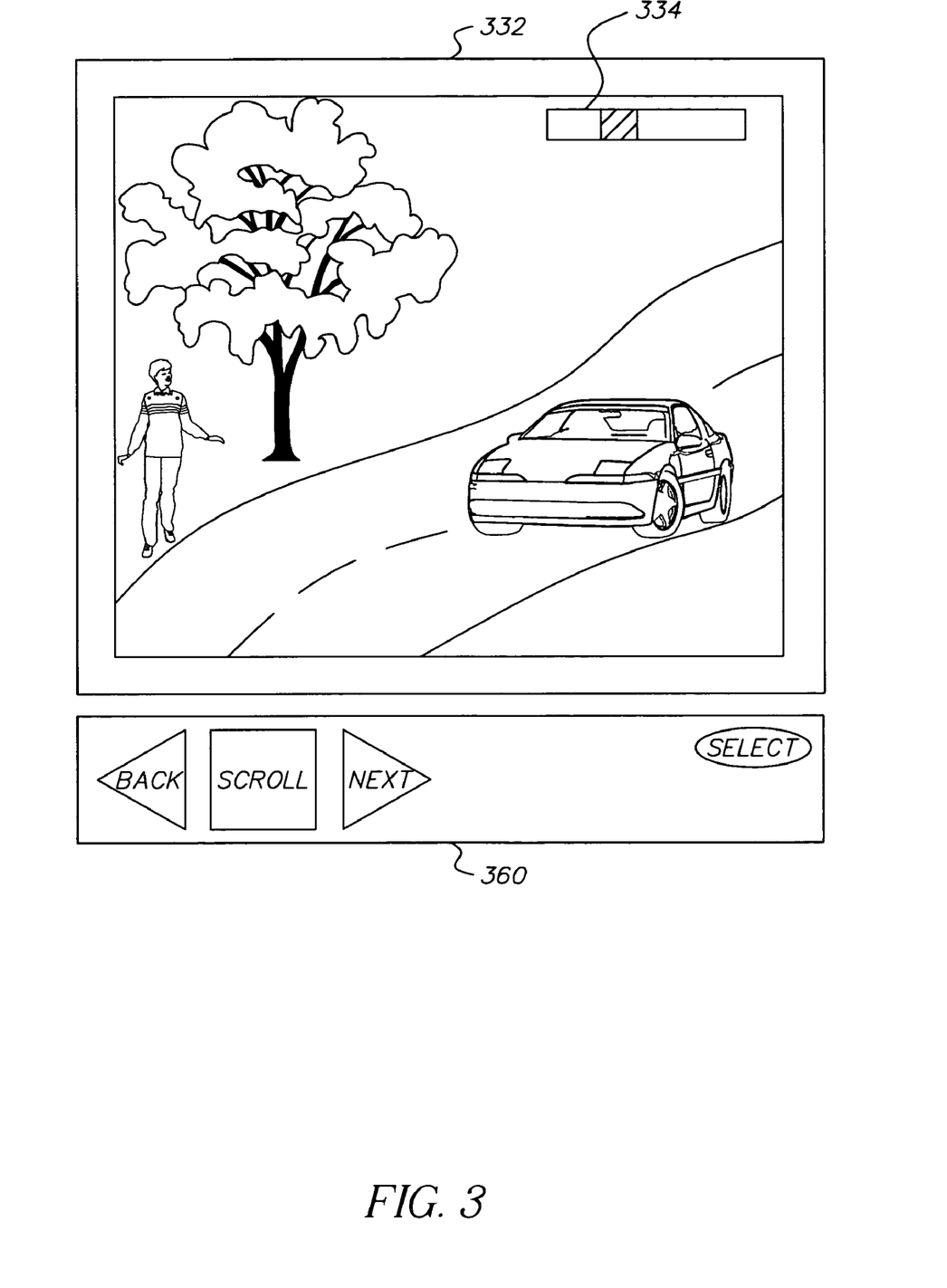
FIG. 3 is an enlarged view of a camera display device made in accordance with the present invention.

Referring to FIG. 3, the digital camera 12 incorporates a color LCD image display 332 for viewing a motion image, and pushbuttons (e.g. keys) 360 for user interaction, comprising of "Select," "Next," "Back," and "Scroll" keys. Note that these keys could alternatively be incorporated in a touch screen or as a mapping of multifunctional buttons.

Figure 4:
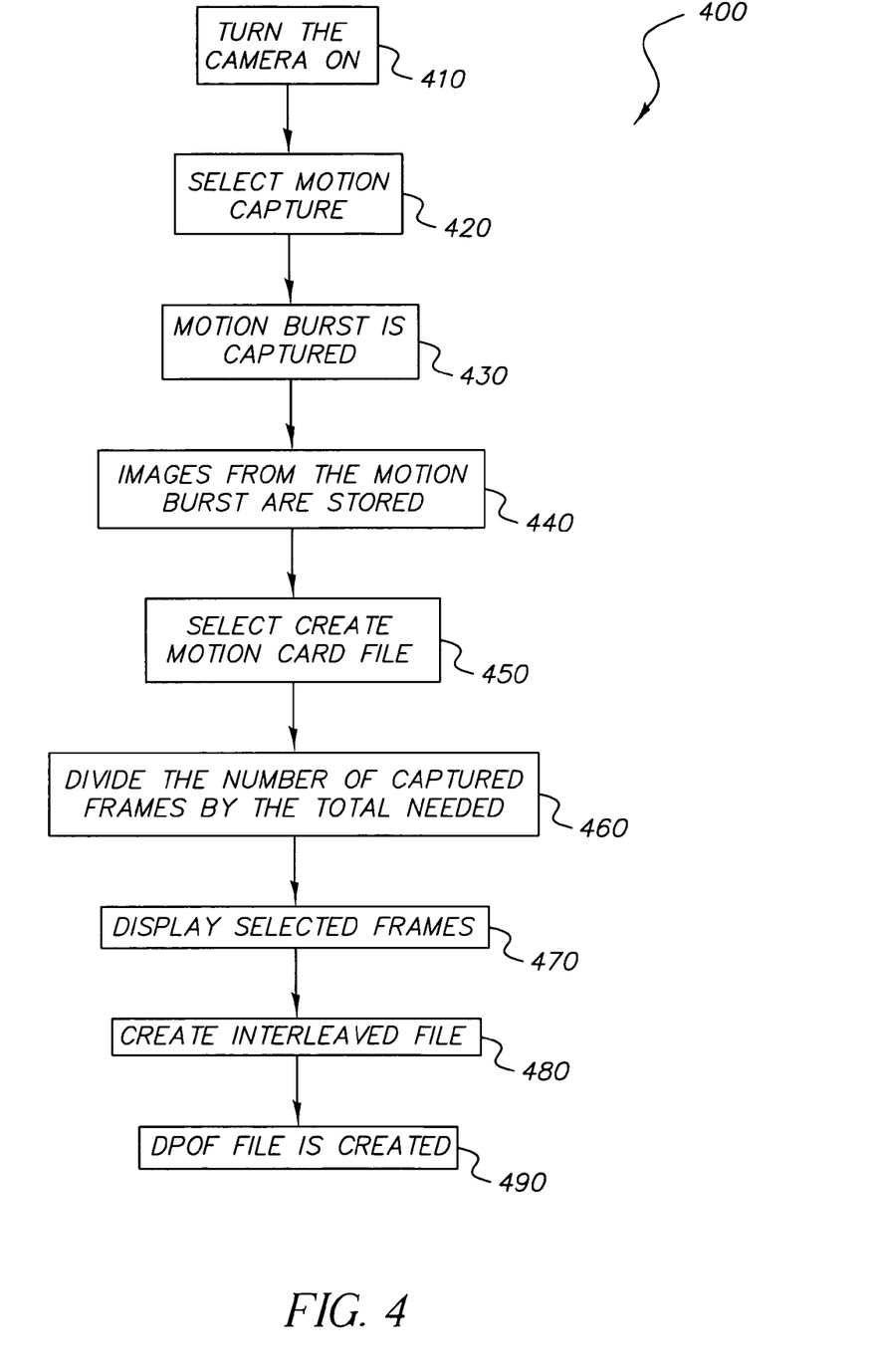
FIG. 4 is a flow diagram illustrating the method of operation in accordance with the present invention.

A lenticular motion card 62 can be created as follows. Referring to FIG. 4, flow diagram 400, the user turns on the digital camera 12 in step 410 and selects "motion capture" in step 420. A motion burst is captured during the time interval that the user holds the capture button down in step 430. The images from the motion burst are stored in step 440. The user selects "create motion card file" in step 450. The camera divides the number of captured frames by the total needed for creation of a motion card in step 460. These frames are displayed on the camera's image display in step 470. An interleaved image file is created in step 480. If the user likes the video as captured, he presses the select button, and the digital print order format (DPOF) order file is created or updated to reflect this choice in step 490. Otherwise, the selection of images is modified by the user.

Referring to FIG. 3, the digital camera 12 includes a color LCD image display 332 which is used for previewing a selected range of video frames captured by the digital camera 12. The digital camera 12 includes user controls 303, as described in the discussion of FIG. 1, for enabling a user to select video frames to form a graphically displayed motion card, and for enabling the user to reselect (e.g. edit) video frames from the sequence of video frames used for display as a preview, as if formed on an actual lenticular motion card 62.

The preview feature of the present invention accurately represents and displays a selected motion sequence as it will appear in a fabricated motion image card so that edits in the sequence may be made by the user to optimize the utility of the motion image card. It is also a natural feature of motion image cards that image quality decreases as the play time represented in the motion card increases. Allowing the user to preview and edit the video sequence helps the user to balance playing time with image quality, to arrive at the optimum motion sequence which will be used to create the lenticular motion card 62.

Figure 5:
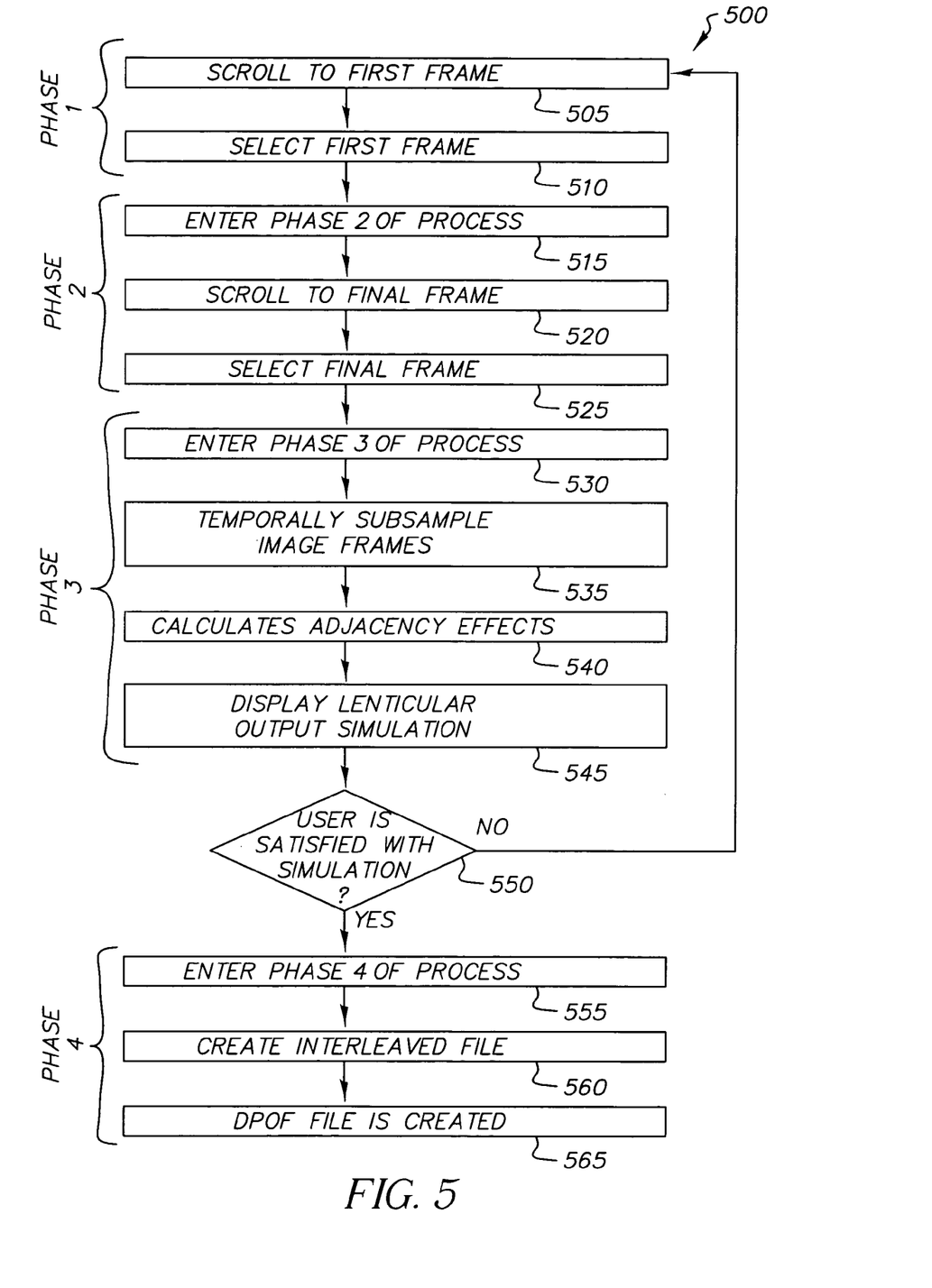
FIG. 5 is a flow diagram illustrating another method of operation in accordance with the present invention.

A preferred system for forming a lenticular motion card 62 from sequentially captured frames, selected from a sequence of frames that have previously been captured by the digital camera 12 will be described as shown in FIG. 5. The process for capturing, previewing, selecting, and forming a motion image card is accomplished in four phases. Once the motion sequence has been captured by the digital camera 12, several steps throughout the four phases (shown in FIG. 5, flow diagram 500) are involved in creating a sequence of images that are suitable for a motion sequence card. In phase I, the color LCD image display 332 and push buttons 360 on the digital camera 12 enable the user to navigate through the captured video clip in order to locate the beginning of the desired sequence. In step 505, the "Scroll" key on the digital camera 12 enables the user to cycle through the video clip until the desired start frame is found. Once the start frame of the video sequence has been selected by pressing the "Select" key, in step 510, the "Next" key on the digital camera 12 causes the user interface program to proceed to phase II and step 515. The "Back" key on the digital camera 12 enables the user to return to the previous step throughout the clip creation process. The first frame that appears on the display is the beginning frame that the user selected in step 510. Phase 2 has two primary subsequent functions. First, step 520 forces the user to scroll through the captured video to verify the contents. Second, step 525 enables the user to select the desired last frame in the video sequence by pressing the "Select" key. Once the end of the sequence has been established, the user interface program progresses to step 530 and phase 3 when the "Next" key is pressed.

Phase 3 provides the user with a simulation of the final lenticular motion card 62. In step 535, the image processor 320 in the digital camera 12 temporally subsamples evenly spaced frames between the user established start and end frames. In step 540, the image processor 320 calculates image adjacency effects based on the temporally subsampled selection, so that it is possible to present a realistic preview in step 545 of phase 3.

The user is assisted in determining the quality of the lenticular output by viewing a simulation that includes adjacency effects. If the time between the start frame and stop frame is long enough to contain large amounts of motion, the resulting lenticular output will be of low quality, because several frames of distinctly different content will be blurred together or even superimposed. If the time and motion is limited such that the difference between frames is minimal, a higher visual quality for the lenticular output will result. The simulation including the adjacency effects facilitates a user's choice to create higher quality lenticular output.

The creation of adjacency effects in step 540 follows step 535, which temporally subsampled the video segment. To better understand one advantage of the present invention, a discussion of adjacency effects is appropriate. In viewing motion cards, individual image frames are not viewable without some overlap of adjacent image views. Typically three to seven image views are overlapped for any particular orientation of the card with respect to the observer. Adjacent overlapped image views are generally perceived as detrimental to the total image quality. Moreover, as the visual difference increases between adjacent images, perceived image quality decreases. Large differences between adjacent image views occur, for example, when the original motion is very rapid, or when the video is temporally sampled at a low rate (i.e., many frames are skipped between those that are saved). For step 545, displaying lenticular output simulation, it is preferred that the preview be constructed in such a way as to show the user the adjacency effect that will appear on the manufactured lenticular motion card 62 when the card is tilted.

Upon completion of the process of temporally subsampling the video segment in step 535, the adjacency effects are recalculated in step 540 every time the user changes either the beginning frame or end frame of the motion sequence. In step 545, the subsampled motion sequence is displayed on the color LCD image display 332. This displayed motion sequence includes the adjacency effects created in step 540. A progress bar 334 is also displayed, as shown in FIG. 3, to indicate the length and temporal position of the selected motion sequence 110 during preview. In step 545, the preview is constructed in such a way as to show the user the effect of adjacency on the motion image which will later occur when observing the tilting lenticular motion card 62.

The adjacency effect can be modeled using equation 1 below to calculate a new set of images from the captured image files, wherein each image of the new set is a linear combination of the captured set. The motion card with adjacency effects included is simulated by playing in sequence the new set of images on the video screen. The nth image of the new simulated set is given by:

$$Is_n = \sum_{m=-j}^{+k} \alpha_{n-m} I_{n-m} \quad \text{(Equation 1)}$$

where $I_{n-m}$ is the (n−m)th image of the captured sequence and the $\alpha_{n-m}$ is a coefficient that describes a fraction of the (n−m)th image that contributes to the image as it is actually viewed when attempting to view the nth image. The coefficients $\alpha_{n-m}$ depend on the degree to which individual views are resolved, and are influenced by both the linewidth in the recorded interleaved image and by the optics of the lenticular screen. The coefficients $\alpha_{n-m}$ are set to match the superimposed images actually observed in a motion card. In general, j=k, however, there can be asymmetry in the line spread function as viewed by an observer through the lenticles, in which case the actually observed motion sequence would more accurately be simulated by having j not equal to k, and with the $\alpha_{n-m}$ representing the asymmetry as well. It is desirable, however, to keep the simulation as computationally simple as possible without significantly affecting the fidelity of the simulation. Experimentation has shown, in fact, that setting j=k=1 and $\alpha_{n-1}=\alpha_{n+1}$ gives a good simulation. In this case, equation 1 reduces to equation 2 given below.

$$Is_n = \alpha_{n-1} I_{n-1} + \alpha_n I_n + \alpha_{n-1} I_{n+1} \quad \text{(Equation 2)}$$

Further, it has been found that the coefficients $\alpha_n$ and $\alpha_{n-1}=\alpha_{n+1}$ can be held constant independent of n with good results. It has been found that the values for the coefficients a depend on whether the motion card is of the transmissive or reflective type. It would be preferred therefore, that if the service provider 22 in FIG. 2 is able to produce both transmissive and reflective cards and the digital camera 12 enables the user to order either type of card, that the simulation in phase 3 of FIG. 5 provides appropriate simulations of the type of card chosen by the user in order to properly simulate the type of motion card that will be produced by the service provider 22. Thus, the customer using the user interface would see different simulations of their cards depending on which type (e.g. reflective or transmissive) they choose to order.

Other attributes of the motion card preview include a re-sampling of each of the n displayed images to match the lenticular pitch. Specifically, for a card having a cross-lenticular (vertical) size given by Y inches and a lenticular spatial frequency of N lenticles/inch, then each distinct displayed image should be characterized by N×Y pixels in the cross-lenticular (vertical) direction. This pixel number will generally be the total number of lines in the interleaved image divided by the number of views. Preview image pixel count in the direction parallel to the lenticles should preferably match the pixel count of the card in that direction.

Once the motion sequence has been viewed and found to be acceptable in decision step 550, the user presses the "Next" key to proceed to the final phase, phase 4 (step 555). If however, the motion sequence is found to be unacceptable in decision step 550, the user can return to the previous steps and reselects the start and end frames of the motion sequence. Phase 4 includes building the interleaved image file in step 560. The compositing algorithm builds an interleaved image file from the individual image frames of the motion sequence.

A compositing technique for forming images suitable for viewing through lenticular screens for motion or other types of lenticular imaging will be described. First, the image frames must be resized so that the total number of pixels in the cross-lenticular direction is equal to the number of lenticles in the specified motion card. In one embodiment, the pixels of the image in the cross-lenticular direction are spatially sub-sampled such that the number of pixels in the image match the number of lenticles in the final output. If the number of selected images is not the same as the predetermined number of frames desired for creating the lenticular motion card as defined by the lenticular printing technology used to produce the lenticular motion card 62, interpolation or multiplication of the image frames must first occur such that the desired number of frames is achieved. Doubling or tripling frames can be effective when a low number of frames has been selected. However, temporal interpolation from a number of frames larger than the predetermined number is to be avoided due to introduction of blurring. When the number of image frames for compositing matches the predetermined number of image frames desired for creating the lenticular motion card 62, the composition of the image to be printed is straightforward. Given the sequence of selected image frames starting with frame 1 and ending with frame n where n equals the predetermined number of frames, the pixels that will be viewed through the first lenticle of the composite image C are composited from the selected frames. The first row of C will be comprised of pixels from the first row of frame 1. The second row of C is comprised of pixels from the first row of frame 2. This compositing will continue until image C has all the first rows of all the selected image frames, ending with the first row of frame n. The composited image at this point corresponds to all the pixels that will be viewed through the first lenticle of the motion card. This process continues with compositing of the second row of the composite image C. This begins with pixels from the second row of frame 1, followed by second row of frame 2, and continuing until the second row of frame n is composited. The process continues until all the rows of all the selected image frames are composited.

Placing such capability in the digital camera 12 takes advantage of the processing power inherent in the image processor 320 and produces a single image file in final form in step 560 for lenticular printing. In step 565, a DPOF compatible order file is created, which uses vendor unique parameters to indicate that the requested print is either a transmissive or reflective lenticular motion card.

The user may desire to select the number of image frames used in the composite image. By actuating a control such as a slider (not shown), the user can select between better clarity of individual frames and a maximum number of frames, hence more motion.

Note that the editing and compositing steps in phases 3 and 4 can alternatively be accomplished after the video has been downloaded to a computer, such as host computer in FIG. 1. However, this alternative method does not provide immediate feedback on the quality of the hardcopy output.

Files for use in creating the lenticular print may be stored in a manner that is indicated by lenticles. For example, compression schemes may be chosen to avoid artifacts accentuated by the interleaving of image files used for creating the lenticular print. Thus, the image compression can be optimized according to the lenticular process.

Subsampling of the video frames need not be linear with respect to time. Motion analysis could determine frame-to-frame differences so that capture or storage of images may provide more frames per second during times of rapid motion and less frames when the detected motion is limited.

An alternative method of using digital camera 12 to create an image sequence for producing the lenticular motion card 62 is to set an optimum frame rate and then capture the video. Capture ends when a maximum number of frames is captured. This maximum number is dictated by the particulars of the lenticular printing technology used to produce the lenticular motion card 62. For example, if the lenticular motion card 62 can generally accommodate 20 frames of motion video assuming some rate of motion, the digital camera 12 will capture only the 20 frames and then stop capturing. Playback will show the resulting video as the card will portray it.

Lenticular output may also be used to show non-motion images. Any sequence of images unrelated on the basis of time or location can be combined on a lenticular card. This sequence can be selected and previewed as described above. In this case, the user selects a number of captured images to be used to create the motion card, and the card can be previewed on the color LCD image display 332. The user can then rearrange the order of the images, or select alternative images.

Figure 6:
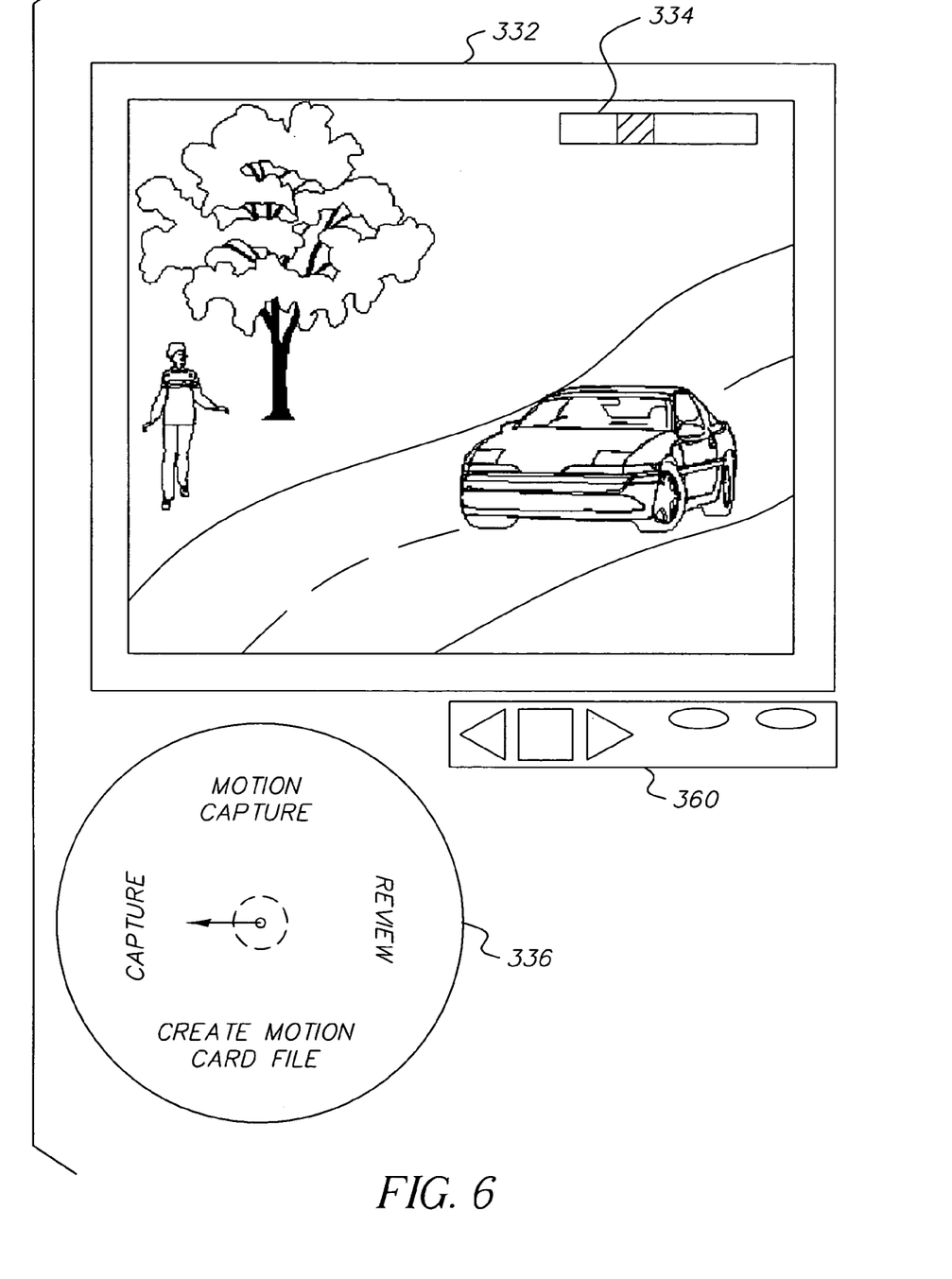
FIG. 6 is a pictorial diagram of a color LCD image display and user interface in accordance with the present invention.

Referring to FIG. 6, an alternative embodiment of a graphical user interface displayed on the color LCD image display 332 is controlled by mode dial 336 and push buttons 360. The digital camera 12 can also include a video output driver and connector (not shown) for displaying the captured images or the print status information on a TV (not shown). The user places the mode dial 336 in the "capture" position prior to capturing images. The user places the mode dial 336 in the "motion capture" position prior to capturing motion burst images and holds the button down to capture motion burst images. The user places the mode dial 336 in the "review" position in order to review the captured images. The user can review the image files and delete undesirable images using push buttons 360.

When the mode dial 336, as shown in FIG. 6, is in the "create motion card file" position, the user can decide which images to use from the motion burst for the service provider 22 to create the lenticular motion card 62. The user can select frames for use in the motion card by pressing the appropriate button as the motion burst is played back on the camera's display. This may occur at a reduced speed so that the user can react to the images as they are displayed.

The selection of images to be used for the lenticular display may also be selected automatically by the digital camera 12. The camera may divide the number of captured frames from a single burst of motion by the number of frames that are available for printing on the lenticular media. Alternatively, the camera may determine motion in the video by means of comparing data in sequential files and assign more images to portions of the burst with more motion.

The camera can know the number of frames used for the lenticular card by data loaded in camera firmware or by data read from the memory card, or by querying a website if the camera is capable of connecting directly to the web. Alternatively, the user can key in the appropriate number.

Figure 7:
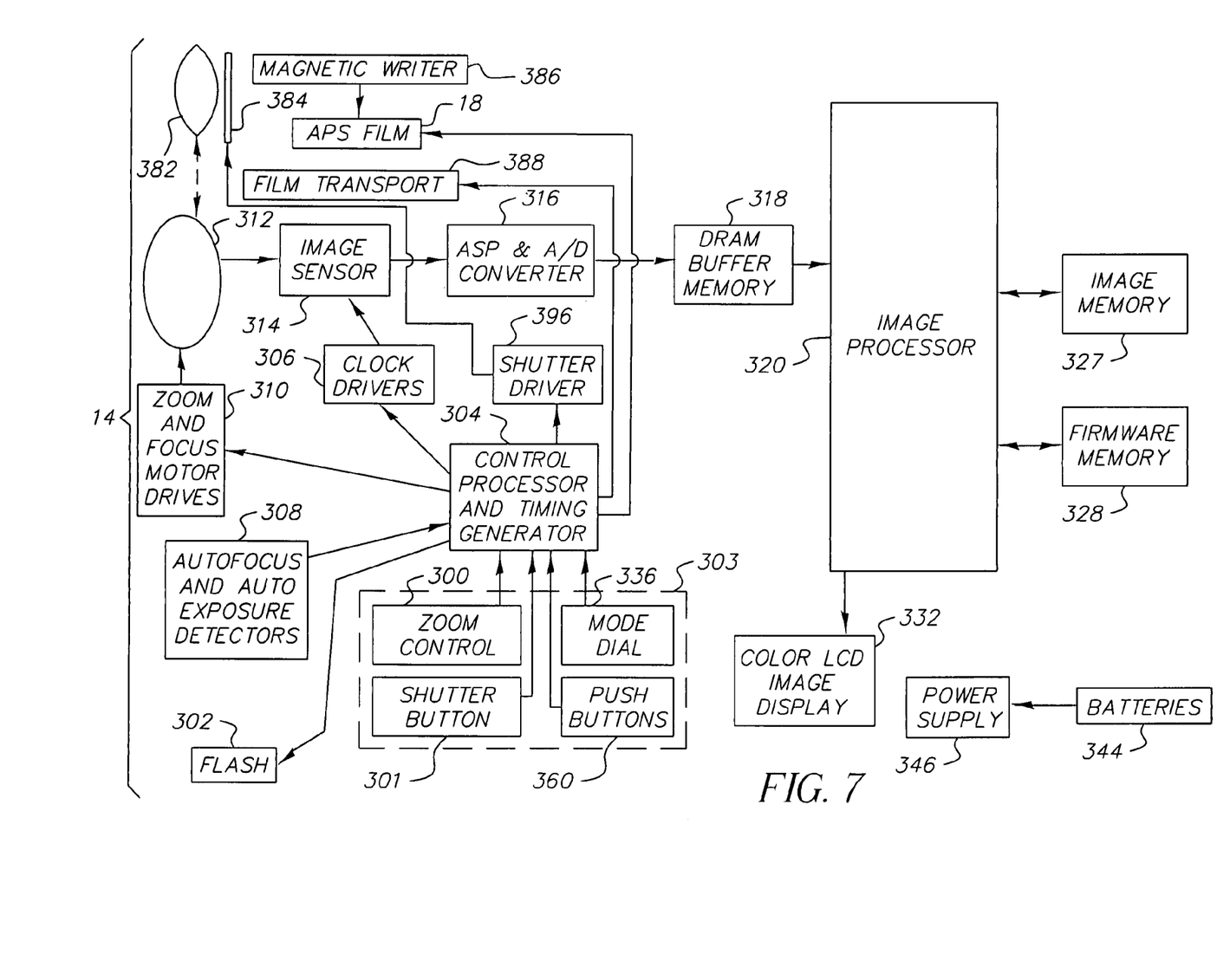
FIG. 7 illustrates in block form a hybrid film/digital camera for implementing the present invention.

The present invention can also be utilized in a hybrid film/digital camera. FIG. 7 illustrates in block form a exemplary hybrid camera 14 for implementing the present invention. The camera 14 is powered by batteries 344 which connect to power supply 346 which supplies power to the camera. The hybrid camera 14 includes a film zoom lens 382 coupled to the zoom lens 312 used with the electronic sensor. Therefore, zoom and focus motor drives 310 control both lens 382 and lens 312. The film zoom lens 382 focuses light from the scene onto a frame of photographic film, which in a preferred embodiment is APS type film 18. As each image is captured, the film is advanced by film transport 388 under control of control processor and timing generator 304. A magnetic writer unit 386 writes digital data to the film leader, and to each frame, of the APS film 18, under control of control processor and timing generator 304.

As described earlier relative to FIG. 1, various user controls 303, such as zoom lens control 300, shutter button 301, a mode dial 336, and push buttons 360, send electronic signals to a control processor and timing generator 304 in order to control the picture taking and other camera operations. The user composes the image using the optical viewfinder (not shown) and the zoom lens control 300, and then depresses the shutter button 301 to begin capturing a still image. The lenses 312 and 382 focus light from the scene (not shown) onto the electronic image sensor 314 and the APS film 18, respectively. The electronic image sensor 314 can be a low resolution image sensor, since it is used only to provide an LCD image display. In an alternative embodiment, a fixed focal length lens is used in place of the zoom lens 312, and the image from the image sensor 314 is electronically zoomed in order to provide the same field of view provided by the film zoom lens 382.

The exposure of the scene light onto the APS film 18 is controlled by aperture/shutter 384 via shutter driver 396. As a frame of APS film is exposed, the image sensor 314 is controlled by clock drivers 306 to simultaneously capture an electronic image. The zoom and focus motor drives 310, the shutter driver 396, and the clock drivers 306 are controlled by control signals supplied by the control processor and timing generator 304. The control processor and timing generator 304 receives input from autofocus and auto-exposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by an image processor 320 controlled by the firmware stored in the firmware memory 328, which can be flash EPROM memory. The firmware stored in firmware memory 328 controls the image processor 320 in the digital camera 12 in order to implement the method of operation of the present invention, as was described earlier in reference to FIG. 4 and FIG. 5.

The processed digital image file is provided to an image memory 327, which stores the digital image files corresponding to the exposed film frames. In FIG. 7, the image memory 327 is preferably internal Flash EPROM memory, although other types of internal or removable memory can alternatively be used to store the digital images. The image processor 320 performs color interpolation followed by color and tone correction, in order to produce rendered sRGB image data. The rendered sRGB image data is then JPEG compressed in order to reduce the file size, and stored as a JPEG image file in the image memory 327. Depending on the resolution of the image sensor 314, the processor 320 can also resample the image, prior to compression and storage, so that the image is appropriately sized for display on the color LCD image display 332.

In the same manner as described earlier for the digital camera 12, the user of the hybrid camera 14 can preview and order lenticular motion cards 62. The order information defining the image frames to be used to produce the lenticular motion cards 62 is magnetically written on the leader of the APS film using magnetic writer 386, as the film is rewound into the film cartridge after the entire film has been exposed.

In an alternative embodiment, the hybrid camera 14 includes film, digital and hybrid modes, as described in commonly assigned U.S. Pat. No. 5,845,166, by Fellegara et al., entitled "Hybrid Camera With Identification Matching Of Film And Electronic Images," Dec. 1, 1998, the disclosure of which is incorporated herein by reference.

Figure 8:
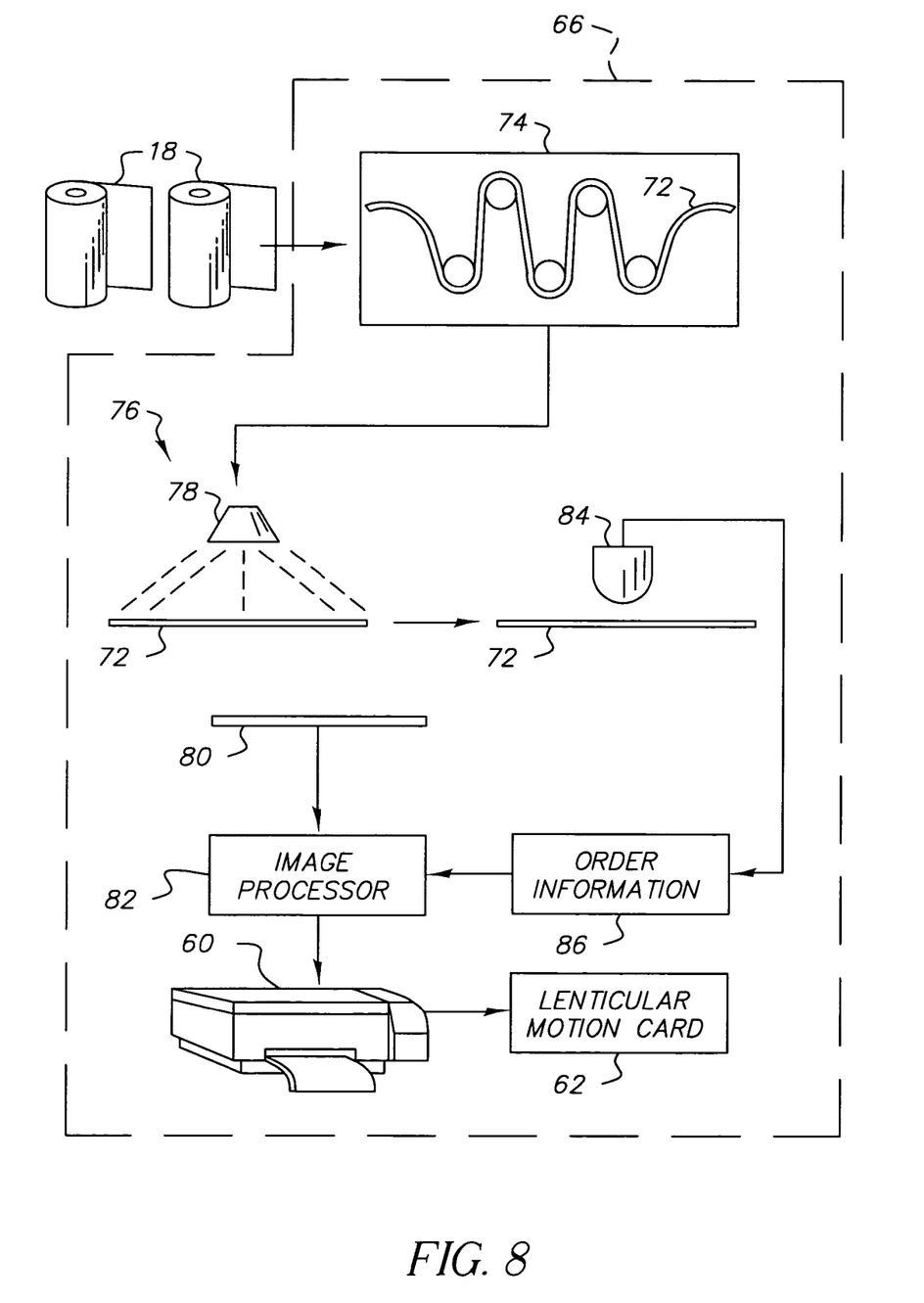
FIG. 8 illustrates in block form a digital photofinishing system for producing lenticular output from film images.

FIG. 8 illustrates a digital photofinishing system 66 for producing lenticular motion cards from the latent images and order information on APS film 18, which was exposed in hybrid camera 14. The APS film 18 is developed in a film developer 74 to produce developed filmstrip images 72. The developed filmstrip images 72 are then digitized in a scanner 76 (illustrated in FIG. 8 as a projection lamp 78 and a detector 80) to generate a series of digital images corresponding to the film images. The digital images are sent to an image processor 82. The order information recorded magnetically on the leader of the developed filmstrip 72 is read by a magnetic reader 84 in order to determine what type of lenticular motion card 62 to produce (e.g. transmissive or reflective) and what film frames should be used to produce the card. The order information 86 is provided to the image processor 82, which produces a single composite image using the digital images from the appropriate film frames. The composite image is printed by the lenticular image printer 60, which produces lenticular motion card 62.

The invention has been described in detail with particular reference to certain preferred embodiments thereof, but it will be understood that variations and modifications can be effected within the scope of the invention. The present invention being defined by the claims that follow.

| PARTS LIST | |
|---|---|
| 10 | host computer |
| 12 | digital still camera |
| 14 | hybrid camera |
| 16 | removable memory card |
| 18 | APS film |
| 20 | communication device |
| 22 | service provider |
| 24 | communication network |
| 40 | server |
| 50 | image manipulation computer |
| 60 | lenticular image printer |
| 62 | lenticular motion card |
| 66 | digital photofinishing system |
| 72 | developed filmstrip images |
| 74 | film developer |
| 76 | scanner |
| 78 | projection lamp |
| 80 | detector |
| 82 | image processor |
| 84 | magnetic reader |
| 86 | order information |
| 300 | zoom lens control |
| 301 | shutter button |
| 302 | flash |
| 303 | user controls |
| 304 | control processor and timing generator |
| 306 | clock drivers |
| 308 | autofocus and auto-exposure detectors |
| 310 | zoom and focus motor drives |
| 312 | zoom lens |
| 314 | image sensor |
| 316 | converter circuit |
| 318 | DRAM buffer memory |
| 320 | image processor |
| 322 | host interface |
| 324 | memory card interface |
| 326 | RAM memory |
| 327 | image memory |
| 328 | firmware memory |
| 332 | color LCD image display |
| 334 | progress bar |
| 336 | mode dial |
| 342 | interface cable |
| 344 | batteries |
| 346 | power supply |
| 360 | push buttons |
| 382 | film zoom lens |
| 384 | aperture/shutter |
| 386 | magnetic writer |
| 388 | film transport |
| 396 | shutter driver |
| 400 | flow diagram |
| 410 | operating step |
| 420 | operating step |
| 430 | operating step |
| 440 | operating step |
| 450 | operating step |
| 460 | operating step |
| 470 | operating step |
| 480 | operating step |
| 490 | operating step |
| 500 | flow diagram |
| 505 | operating step |
| 510 | operating step |
| 515 | operating step |

-continued

PARTS LIST

| | |
|---|---|
| 520 | operating step |
| 525 | operating step |
| 530 | operating step |
| 535 | operating step |
| 540 | operating step |
| 545 | operating step |
| 550 | decision step |
| 555 | operating step |
| 560 | operating step |
| 565 | operating step |

What is claimed is:

1. A digital camera for capturing images to be provided to a lenticular apparatus, comprising:
    a digital camera that can capture digital images;
    a memory that stores the captured digital images;
    a processor for processing the captured digital images,
    a display for displaying a motion sequence of captured images, and
    a user interface on the digital camera that enables a user to select a subset of the captured digital images, wherein the selection of the subset of the captured digital images is responsive to a user's selection of minimum and maximum clarity of the motion sequence of captured digital images, and store the selected subset of the captured digital images in the memory prior to transmitting to a lenticular apparatus for constructing a lenticular hardcopy of the subset of the captured digital images, wherein the processor is used to produce a processed motion sequence including adjacency effects that will be visible in the lenticular hardcopy, and the display is used to display the processed motion sequence to provide the user with an accurate preview of a lenticular end product and its quality correlating to large temporal sampling differences.

2. The digital camera claimed in claim 1, wherein the captured digital images are selected from a sequence of motion burst digital images.

3. The digital camera as claimed in claim 2, wherein the sequence of motion burst digital images is displayed at a rate differing from a capture rate.

4. The digital camera as claimed in claim 1, wherein the subset of captured digital images includes a number of frames corresponding to the lenticular hardcopy.

5. The digital camera as claimed in claim 4, wherein the number of frames is dictated by the digital camera.

6. A method of selecting motion burst still images for lenticular motion card display:
    a) navigating through a set of motion burst still images such that a first endpoint is found;
    b) navigating through the set of motion burst still images such that a second endpoint is found;
    c) displaying the set of motion burst still images;
    d) selecting a subset of the motion burst still images corresponding to the second endpoint;
    e) storing the subset of motion burst still images onto a memory device;
    f) producing from the subset of motion burst still images, a processed motion sequence including adjacency effects that will be visible in a lenticular hardcopy to provide a user with an accurate preview of a lenticular end product and its quality correlating to large temporal sampling differences; wherein the selection of the subset of the motion burst still images is responsive to a user's selection of minimum and maximum clarity of the set of motion burst still images,
    g) displaying the processed motion sequence, and
    h) transmitting the subset of motion burst still images to an apparatus that constructs the lenticular hardcopy from the selected subset of motion burst still images.

7. The method claimed in claim 6, wherein the user's selection is facilitated by a slider.

8. The method claimed in claim 6, further comprising the steps of:
    g) combining the selected subset of the motion burst still images into a single formatted digital image for lenticular display; and
    h) storing in a memory prior to a lenticular service provider constructing the lenticular hardcopy of the subset of the motion burst still images.

* * * * *